United States Patent [19]

Robinson

[11] 4,404,158

[45] Sep. 13, 1983

[54] METHOD OF MAKING A BUILDING PANEL

[75] Inventor: Ralph C. Robinson, Redmond, Wash.

[73] Assignee: Olympian Stone Company, Redmond, Wash.

[21] Appl. No.: 97,197

[22] Filed: Nov. 26, 1979

Related U.S. Application Data

[62] Division of Ser. No. 884,437, Mar. 8, 1978, Pat. No. 4,223,502.

[51] Int. Cl.[3] .......... B28B 21/44; B28B 21/70; B29D 3/00

[52] U.S. Cl. .......... 264/263; 29/460; 264/264; 264/279; 264/309; 264/333

[58] Field of Search .......... 264/155, 156, 256, 259, 264/261-263, 309-333, 245, 246, 279, 264; 52/510, 602, 603, 612; 29/460

[56] References Cited

U.S. PATENT DOCUMENTS

| | | | |
|---|---|---|---|
| 868,411 | 10/1907 | Cilek | 52/602 |
| 948,752 | 2/1910 | Wightman | 52/597 |
| 1,750,113 | 3/1930 | Martin | 264/256 |
| 2,114,048 | 4/1938 | Davis | 52/405 |
| 2,130,911 | 9/1938 | Teunon | 52/741 |
| 2,193,207 | 3/1940 | Rosen | 52/506 |
| 3,299,601 | 1/1967 | Chiville | 52/597 |
| 3,694,533 | 9/1972 | Kelsey | 264/261 |
| 3,723,233 | 3/1973 | Bourke | 52/612 |
| 3,724,152 | 4/1973 | Castellarin | 52/612 |
| 3,885,008 | 5/1975 | Martin | 52/829 |
| 3,901,963 | 8/1975 | Werner | 264/306 |
| 3,963,846 | 6/1976 | Bourke | 52/806 |
| 3,982,876 | 9/1976 | Eisenbach | 264/261 |
| 4,159,361 | 6/1979 | Schupack | 106/99 |
| 4,166,749 | 9/1979 | Sterrett et al. | 106/99 |
| 4,173,486 | 11/1979 | Cheetham et al. | 106/99 |
| 4,191,585 | 3/1980 | Jaunaris | 106/99 |

FOREIGN PATENT DOCUMENTS

| | | | |
|---|---|---|---|
| 2304742 | 10/1976 | France | 52/315 |
| 402354 | 5/1966 | Switzerland | 52/315 |
| 432202 | 7/1939 | United Kingdom | 264/259 |
| 570445 | 7/1945 | United Kingdom | 52/602 |

*Primary Examiner*—Willard E. Hoag

*Attorney, Agent, or Firm*—Graybeal & Uhlir

[57] ABSTRACT

A method for making a panel adapted for mounting on a building, the panel being formed from a plurality of thin panels of a selected stone facing material, such as granite or marble, backed and interconnected by fiberglass-strengthened concrete underlaying the plurality of thin panels and covering and engaging anchor means mounted in the backs of the stone panels. The method of forming the building panel involves placing the granite or marble panels face down in a form, mounting anchor means in the backs thereof, and overlaying both the plurality of thin panels and the anchor means with a fiberglass-strengthened concrete mixture, and curing the mixture both within and without a support form.

6 Claims, 11 Drawing Figures

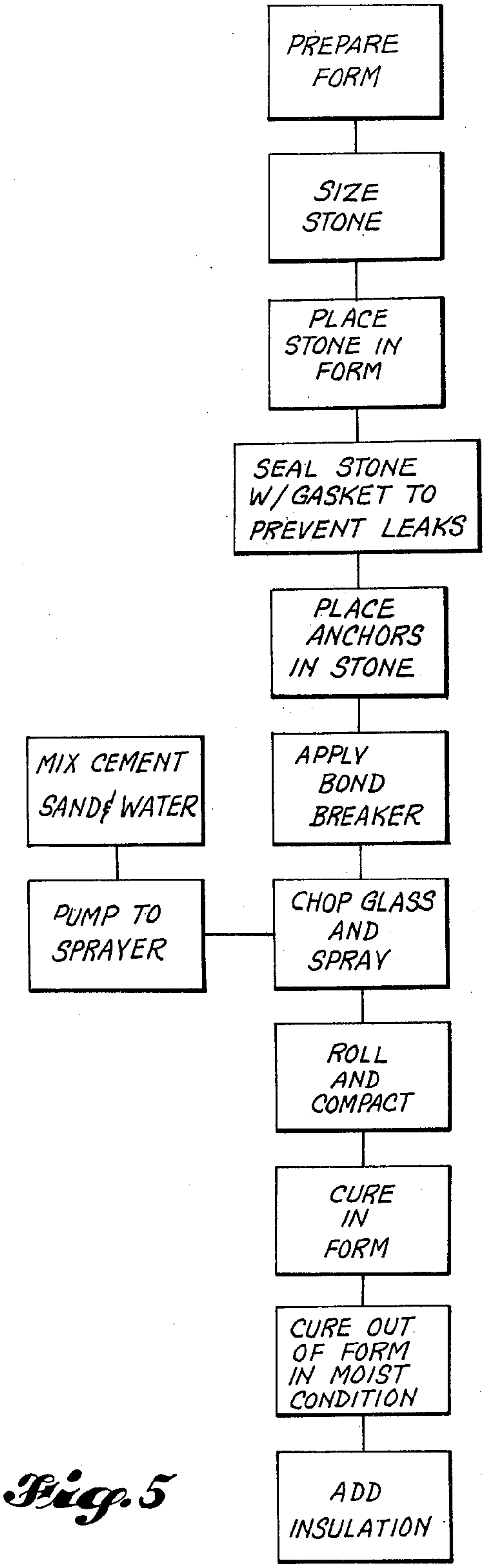
Fig. 5
Fig. 10
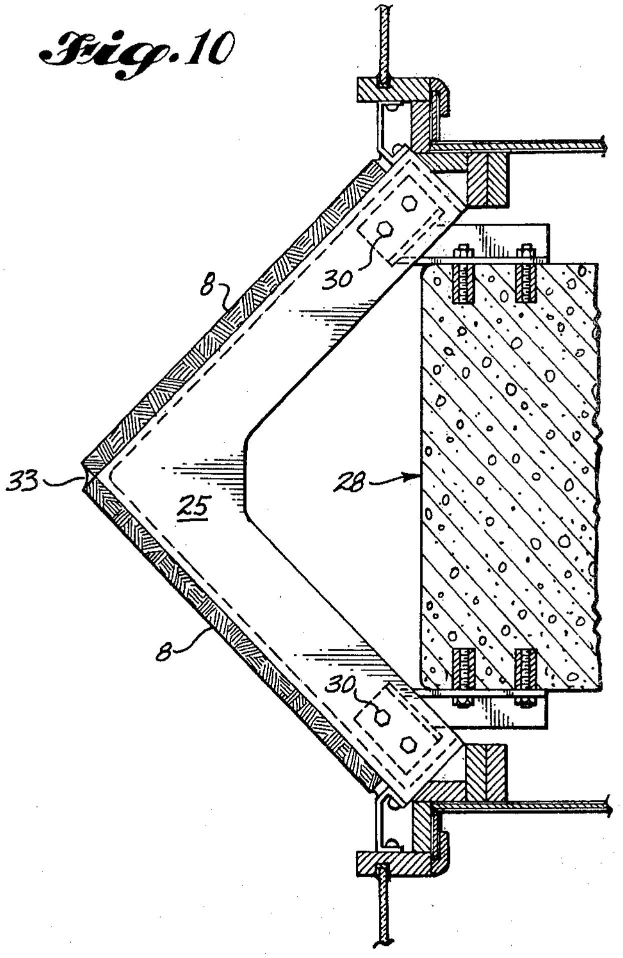
Fig. 11
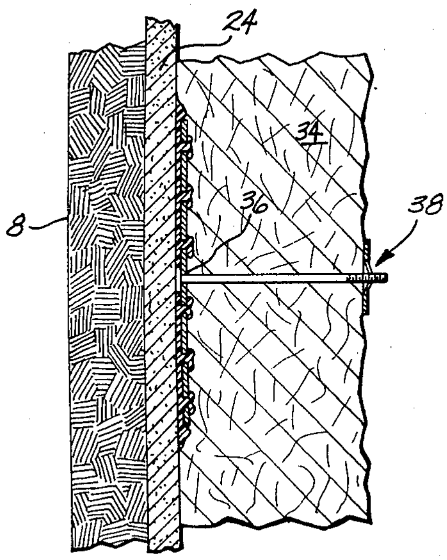

METHOD OF MAKING A BUILDING PANEL

CROSS REFERENCE TO RELATED APPLICATIONS

This application is a division of pending prior application Ser. No. 884,437, filed Mar. 8, 1978 now U.S. Pat. No. 4,223,502.

FIELD OF THE INVENTION

The present invention relates, in general, to the building panel art, and more particularly, to the art of manufacturing and mounting on buildings, an exterior facade formed of integrally joined thin granite or marble.

DESCRIPTION OF THE PRIOR ART

In the past, several methods have been employed to provide a building structure, such as a skyscraper, with a facade of a selected facing material such as marble or granite. Although each of the methods was moderately successful, each had inherent weight or structural disadvantages which the present invention has overcome.

In an early construction method, selected pieces of facing material of marble or granite were handset directly on the structural steel skeleton or poured concrete structure of the building and held thereto by bolts or the like. In this construction, the panels of the stone facing material were required to be at least several inches thick in order to have the strength to support their own weight without cracking. Such thick panels were both costly to make and difficult to handle if made with a desirably large height and width to speed covering of the building surface. If panels having small height and width dimensions were used, an increased number of panels were required to cover a building surface, thus also increasing the number of time-consuming panel mounting operations required.

A later method of attaching granite or marble facing to a building is shown in Castellarin, U.S. Pat. No. 3,724,152 to include backing the selected architectural grade facing material with a supporting member of a suitable hard stone such as marble or granite and then backing this stone with a layer of conventional concrete. The facing material and its stone and concrete backing were then fastened to the building structure by suitable fastening means such as bolts. In this method, relatively thin panels of a facing material were used, but the stone and concrete backing itself was required to have a great weight and thickness in order to support its own weight, and the weight of the panel, without cracking.

Bourke, U.S. Pat. No. 3,723,233, shows a marble faced composite wall panel comprising a marble lamina bonded by an adhesive to a backing. The backing is a structure of metal honeycomb skinned with a layer of glass fiber. Bourke, U.S. Pat. No. 3,963,846, replaces the structure of metal honeycomb of the '233 patent with a multi-cellular paper core. The core consists of a honeycomb structure of phenolic resin impregnated paper in the form of a sheet, with individual cells extending perpencicularly to the planes of both the sheet and the marble lamina. Adhesive bonding of stone panels and non-stone backing material are peculiarly subject to unbonding caused by differences in the expansion coefficients of the materials when subjected to the effects of the sun or cold temperatures after mounting on a building.

Martin, U.S. Pat. No. 3,885,008, while not relating to the cladding of buildings with marble or granite, discloses a prefabricated wall panel which is molded as a unit for mounting on wood frame buildings.

As will be discussed more fully below, the present invention overcomes the inherent weight and structural limitations of the prior art, by overlaying the back of a number of pre-sized panels of a selected facing material such as marble or granite, having anchor means, partially disposed therewithin, with a relatively thin, sprayed-on layer of fiberglass-strengthened concrete backing. The resulting building panel is then adapted to be secured to a building structure by suitable fastening means secured to a plurality of integral, concrete support ribs formed upon the rear surface of the building panel.

SUMMARY OF THE INVENTION

A principal object of the present invention is to provide an improved method of covering a building structure with marble or granite facing.

Another object is to provide a building panel structure which is lightweight and includes a plurality of relatively thin panels of facing material such as marble, granite or the like.

Still another object is to provide an improved means for interconnecting a plurality of granite or marble facing slabs for rapid and secure attachment to a building.

Another object is to provide a means for cladding a building with marble or granite which has the additional result of increasing the ease with which the building can be fireproofed.

Still another object is to provide a granite or marble cladding panel which can be factory manufactured and which can be insulated prior to installation.

One more object of the present invention is to provide a method of forming a granite or marble faced building panel by placing a plurality of pre-sized granite or marble facing panels into a supporting form, securing anchors to the back sides of the granite or marble facing panels, forming a slurry of concrete and segmented glass fiber strands, spraying the slurry on the back surface of the facing panels to join them and overlaying the anchors to structurally connect the panels to the concrete, forming a plurality of support ribs from the slurry, each rib extending laterally across the back surface of the panels, and curing the concrete slurry.

The foregoing and other objects, features, and advantages of the present invention will become more apparent in the light of the detailed description of a preferred embodiment thereof set forth hereafter, and illustrated in the accompanying drawings.

DESCRIPTION OF THE DRAWINGS

FIG. 5 is a flow diagram illustrating one typical method of forming a building panel in accordance with the present invention.

FIG. 10 is a top plan view of one typical embodiment of a building panel secured to a building structure.

FIG. 11 is a cross-section view of a typical building panel made according to the present invention with a layer of insulation attached.

DESCRIPTION OF THE PREFERRED EMBODIMENT

Figure 1:
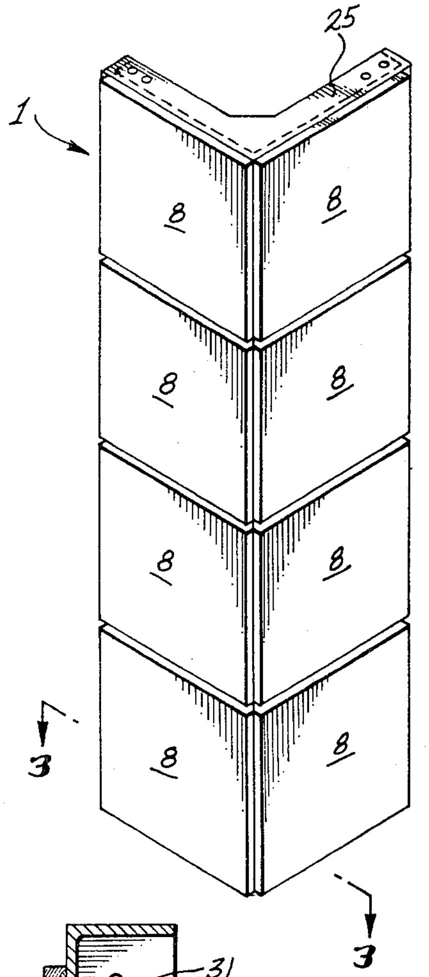
FIG. 1 is a front perspective view of one embodiment of a typical building panel made according to the present invention.

In one embodiment of the present invention, as shown in FIGS. 1–4, the building panel, shown generally at 1, comprises a plurality of pre-sized granite or marble facing panels 8 arranged in edge-to-edge relationship, each panel 8 having a plurality of anchor means 12 therein, and a thin, fiberglass-strengthened, concrete backing 24 overlaying both the backs of panels 8 and the anchor means 12. As will be described in detail hereafter, use of the fiberglass-strengthened concrete backing 24 allows the formation of a plurality of integral structural support ribs 25 disposed upon the back surface of building panel 1, which ribs not only strengthen the panel but also facilitate attachment of the panel to a building. Referring now to the flow chart of FIG. 5, and associated FIGS. 6–9, one method of forming a building panel in accordance with the present invention will be described below.

The mold or form, shown generally at 2, is constructed to the shape of the desired finished building panel. As shown in the embodiment of FIGS. 6–9, the form 2 is a column cover having a generally L-shape, with hinge means 4 being provided to facilitate removal of the form 2 after the building panel has been initially cured. It will be understood that other panel and form shapes may also be used in the practice of the present invention to form not only column covers, but also spandrels and solid wall sections. Form 2, is constructed from any suitable rigid material such as wood, steel, fiberglass, or the like. Hinging means 4 are old per se and their location is a matter of choice.

A slab of a selected facing material 6, such as granite, marble, stone, exposed aggregate concrete, or the like, having a thickness of as little as one-half each, and generally being between one-half and one inch in thickness, is first sawed or otherwise cut to the desired size and shape. As shown, the slab 6 is cut into a plurality of building panels 8 for placing into form 2. It will be understood, however, that a single large panel, or any number of smaller panels may also be used to practice the invention.

Figure 7:
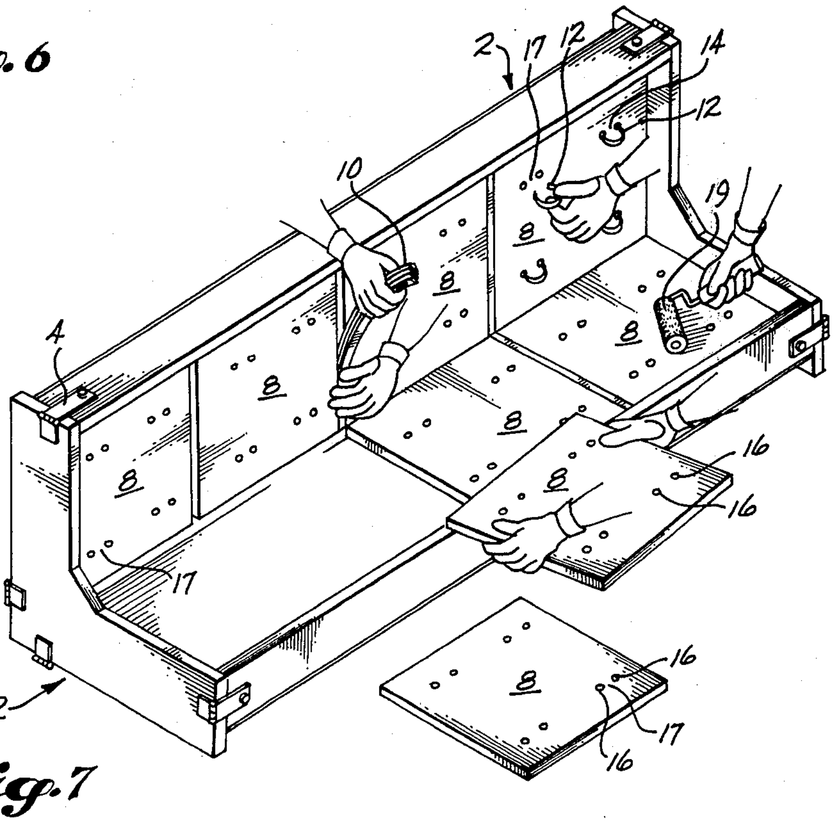
FIG. 7 is a pictorial representation showing additional typical steps in forming a building panel in accordance with the present invention.

Once the building panels 8 have been cut from the slab 6, they are placed face down within form 2 in edge-to-edge relationship as shown in FIG. 7. The adjacent edges of the building panels 8 are then sealed with a gasket 10 to prevent the slurry from running onto the face of the building panel 1 or the form 2. Gasket 10 is constructed from neoprene rubber or any suitable sealing means.

Figure 4:
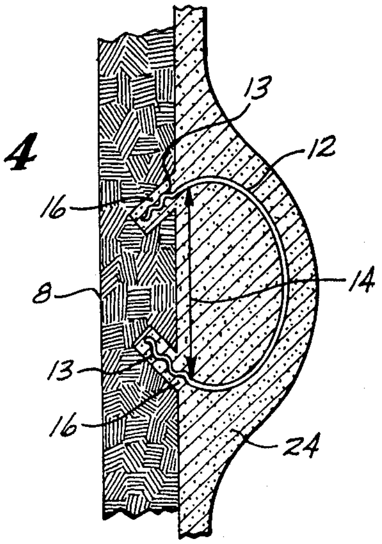
FIG. 4 is a section view taken along lines 4—4 of FIG. 3.
Figure 6:
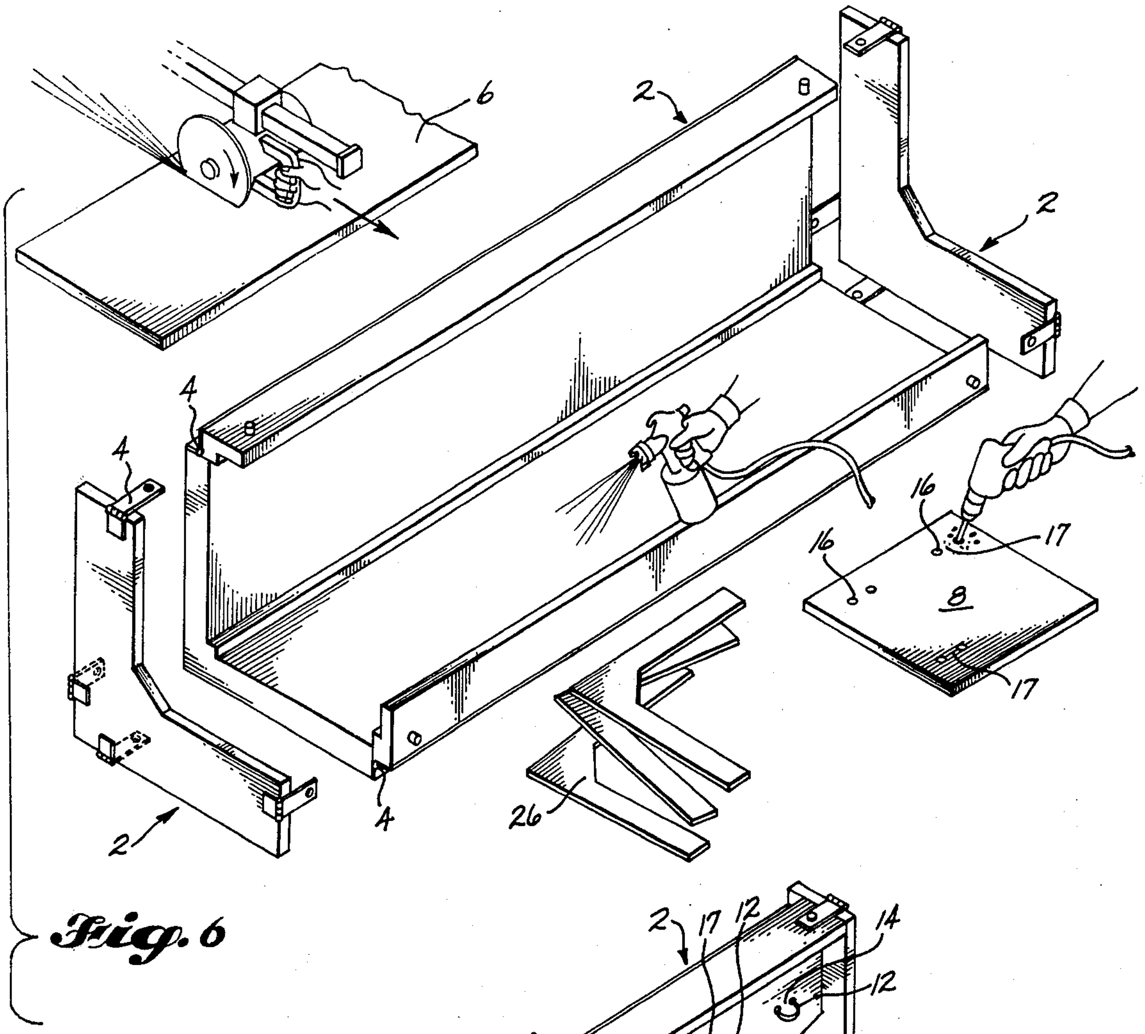
FIG. 6 is a pictorial representation showing the typical initial steps of forming a building panel in accordance with the present invention.

A plurality of anchor means 12 may then be secured to the back surface of the panels 8 such that anchor means 12 extend partially into the surface of panels 8 and partially above the surface of the panels 8 (see FIG. 4). As shown, the anchor means are a plurality of semi-circular clips having an opening 14 and ends 13 at the bottom thereof. The clips 12 can be constructed from any rigid substantially rust resistant component such as stainless steel. As shown in FIG. 4, anchors 12 are secured within the back surface of panel 8 in a plurality of holes 16 drilled into the rear surface thereof. Adjacent holes 16 form a hole pair 17, and are disposed within the rear surface of panels 8 at acute angles with respect to the rear surface of the panels. The distance between holes 16 forming a hole pair 17 is smaller than opening 14 of the clip 12, and in this manner when the plurality of clips 12 are inserted into hole pairs 17, clip ends 13 are urged against the sides of holes 16. The number of clips per panel may be varied responsive to the thickness of the stone panel 8, the type of facing material selected, and the environment in which the building panel will be placed. An American Cement Institute standard requires at least one clip per two square feet of panel with a minimum of two clips per panel.

After anchor means 12 have been secured to the rear surface of panels 8, a connectional bond breaker 19 is applied to the rear surface of the panels. The bond breaker 19 prevents the cracking and breaking of the concrete slurry due to differences in expansion coefficients of the stone panels 8 and the concrete slurry.

A mixture of concrete is then prepared using cement, sand, and water. In the presently preferred embodiment, one hundred pounds of cement is mixed with thirty pounds of sand and enough water, approximately forty pounds, to make a flowable mix. It is to be understood that the weight of sand in the concrete mix can be varied from near zero to a weight equal to that of the cement without departing from the spirit and scope of the present invention. The cement, sand, and water are mixed in a conventional concrete mixer (not shown), and pumped to sprayer 18 (see FIG. 8) through line 20. A substantially continuous strand of glass fiber 22 is run to sprayer 18 from a roll or the like, where it is chopped into a plurality of short segments and mixed with the concrete at the time it is sprayed. Chopper-sprayer 18 is old per se. The percentage of chopped glass fiber in the slurry of glass fiber strengthened concrete 24 may be varied from 2 to 6 percent of the weight of the concrete as desired to meet strength needs. The length of the chopped glass fibers may also be varied, but it has been found that a length of 1.5 inches is satisfactory for most uses. Glass fiber strand 22 must be an alkali resistant glass fiber. One type which has been found satisfactory is marketed under the name LEM-FIL Alkali Resistant Glass Fiber by LEM-FIL Corporation of Nashville, Tenn.

The slurry of glass fiber and concrete 24 is then sprayed over the backs of panels 8, with care being taken to completely cover anchor means 12. Although the thickness of the fiberglass-strengthened concrete mixture 24 may be varied, it has been found that a satisfactory building panel capable of supporting a number of granite or marble pieces on a building may be formed with a thickness of as little as three-eights of an inch, it being understood that the thickness of the slurry over the anchors will be greater to increase the strength of the connection between the granite or marble facing and the glass fiber strengthened concrete support structure.

Figure 8:
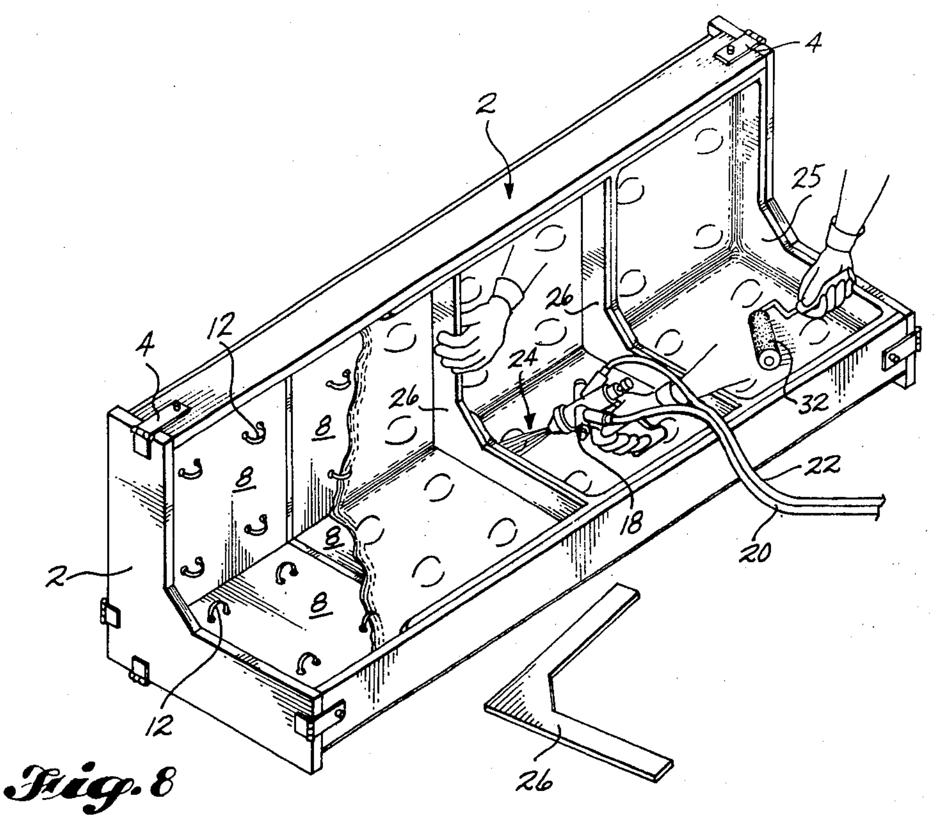
FIG. 8 is a pictorial representation showing still further typical steps in forming a building panel in accordance with the present invention.
Figure 9:
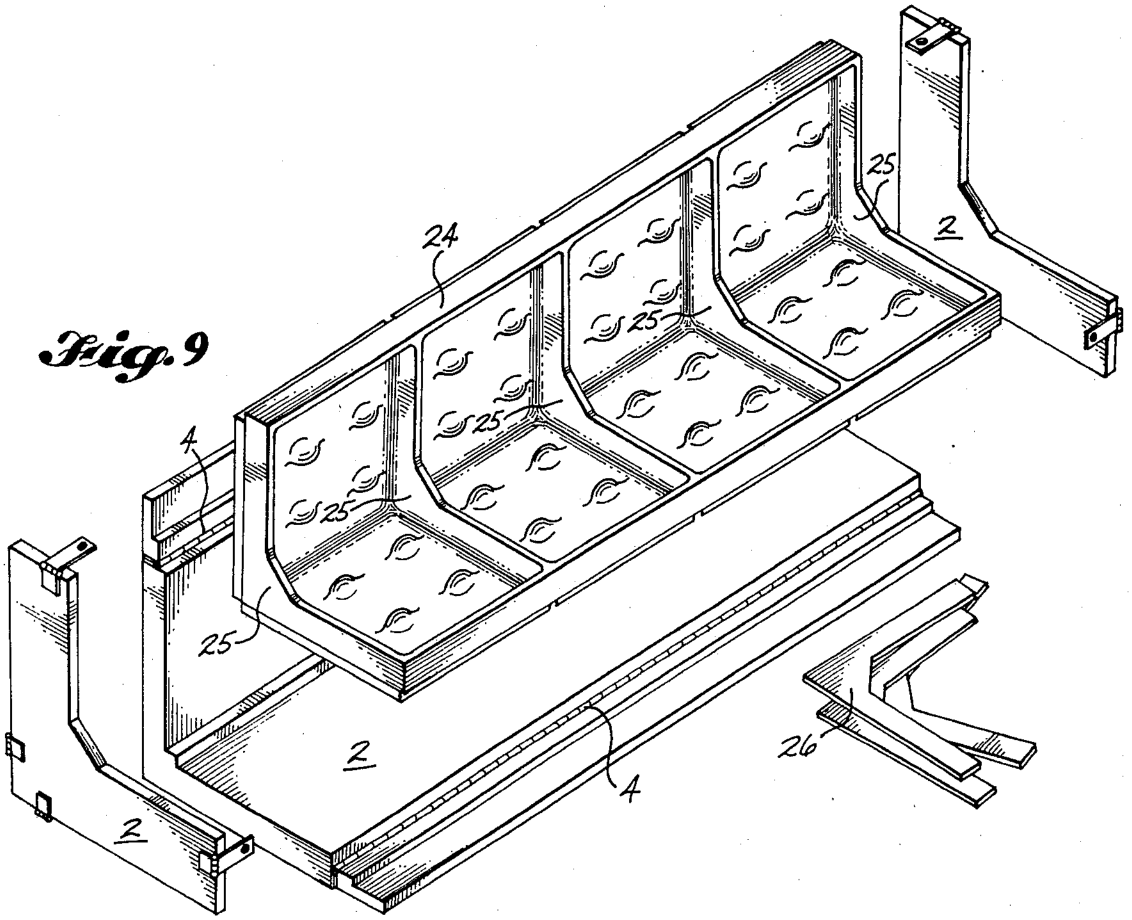
FIG. 9 is a pictorial representation showing the final steps in forming a typical building panel in accordance with the present invention.

The plurality of laterally extending support ribs 25 are formed from the fiberglass-strengthened concrete mixture 24 by placing forms 26 on the rear surface of panels 8 and spraying mixture 24 on one side thereof. The mixture 24 is allowed to cure prior to the removal of forms 26. Forms 26 may be constructed from any suitable material, preferably the same material as that used in form 2. It is to be understood that although form 26 is shown in FIGS. 8 and 9 as having an L-shape, other shapes could also be used to accomplish the goals of strengthening the panel and providing a means for connecting the completed panel to a building. The number of laterally extending support ribs 25 will depend upon the size of building panel 1, and the type and thickness of facing material. As stated above, the plurality of laterally extending support ribs act both as stiffening and strengthening members for the building panel, and as means by which the building panel is secured to a structure 28. Referring to FIG. 10, it can be seen that the building panel may be secured to a structure 28 by fastening means 30 disposed within holes located at the ends of the support ribs 25. The glass fiber reinforced concrete ribs, although relatively thin, are sufficiently strong to support the weight of the building panel on a building without additional reinforcement around fastening means 30.

As the glass fiber reinforced concrete mixture 24 is sprayed on the back of the plurality of panels 8 in the form 4, it is rolled and compacted by means of rollers 32 or other suitable means. Additional rolling and compacting of the glass fiber strengthened concrete mixture 24 may be needed prior to curing.

After the glass fiber concrete slurry 24 has been applied to the rear surface of the plurality of panels 8, and the plurality of support ribs 25 have been formed, the building panel 1 is allowed to cure in the form 2 for a period of approximately 12 hours. After that time, form 2 is unhinged and removed, and the building panel is allowed to cure for approximately an additional 7 days. During this time, the building panel is maintained in a moist environment such as by intermittent spraying with water. It is to be understood that the curing times mentioned above are only approximate and may be varied somewhat without departing from the spirit and scope of the invention.

After the building panel has been completely cured, a conventional caulking material 33 is applied to the front face of the building panel between the adjacent edges of the plurality of granite or marble panels.

Figure 2:
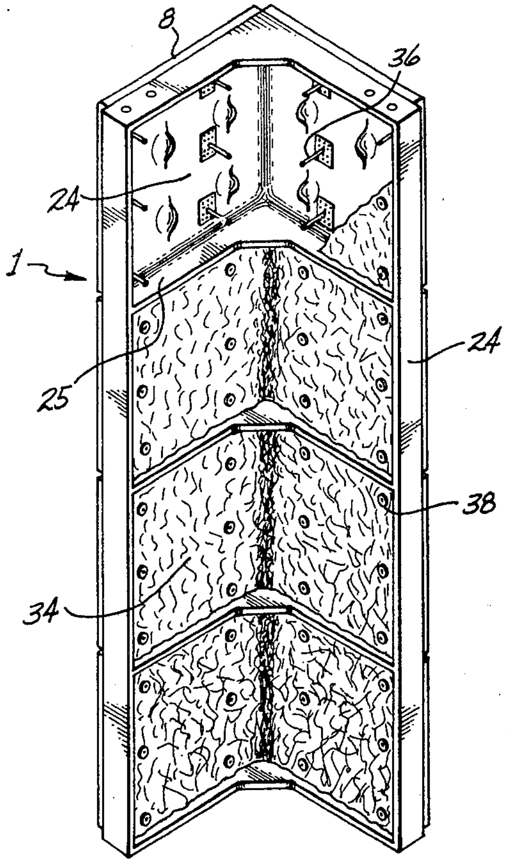
FIG. 2 is a rear perspective view of one typical embodiment of a building panel constructed according to the present invention.
Figure 3:
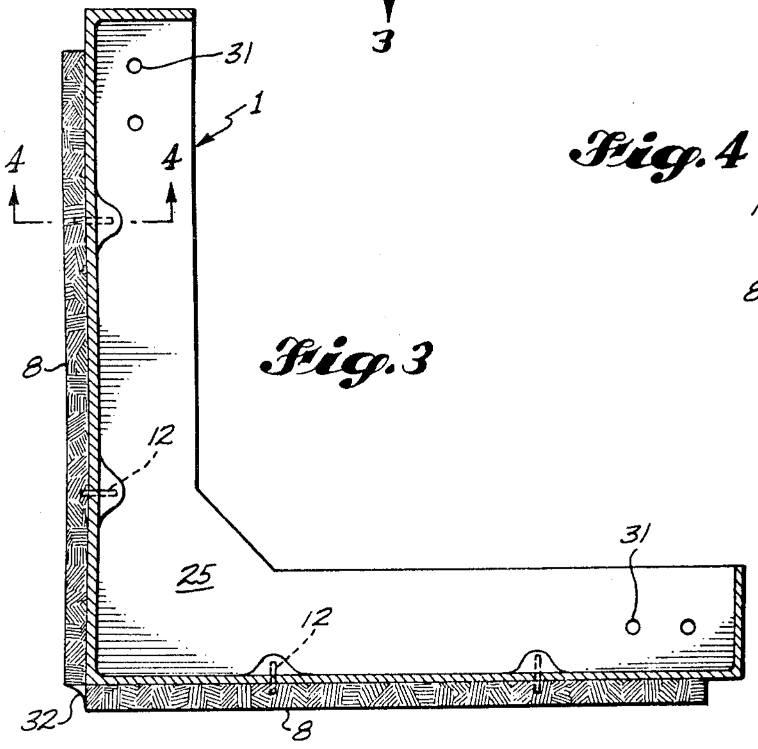
FIG. 3 is a cross sectional view taken along lines 3—3 of FIG. 1.

If desired, a layer of insulation may be applied on the rear surface of the building panel 1. Insulation 34 may be sprayed on, or as shown in FIGS. 2 and 11, may be applied to the rear surface of the panels 8 by gluing a plurality of pins 36 thereto, and securing the blanket of insulation 34 thereon by fastener means, such as snap-on nuts 38 or the like. Application of insulation at factory where the building panel is fabricated, eliminates the often difficult and time consuming task of applying insulation at the building site after installation.

There has thus been described a preferred embodiment of a building panel having a granite or marble facing, and a method of making same in accordance with the present invention. The terms granite and marble have been used interchangeably herein because the present invention is believed to solve problems which have existed with respect to the use of both of those natural stones as either exterior or interior wall coverings. It will be obvious to anyone skilled in the art that the teachings of this invention may be used to advantage in any situation where it is necessary to provide a light-weight building panel with a facing of a natural stone material such as granite or marble. Therefore, it should be understood by those skilled in the art that various changes and omissions in the form and detail thereof may be made therein without departing from the spirit and scope of the invention.

I claim:

1. A method of forming a building panel from a plurality of relatively thin, pre-sized panels of a selected facing material such as granite or marble, comprising the steps of:

(a) placing the panels of the selected facing material face down into a supporting form;
(b) placing sealing means between adjacent edges of said panels and said form;
(c) securing anchors to the back surface of each panel of said facing material;
(d) applying connectional bond breaker to the back surface of each panel;
(e) forming a slurry of concrete and chopped glass fiber strands;
(f) spraying the slurry directly on the back surface of said panels of facing material to cover said panels and said anchors to form an integral, panel supporting frame; and,
(g) curing said slurry and removing the completed building panel from said supporting form.

2. The method of claim 1, wherein the step of rolling and compacting said slurry on the back surface of said panels of facing material after spraying.

3. The method of claim 1, wherein the chopped glass fibers in said slurry are equal to between two and six percent by weight of said concrete.

4. The method of claim 1, wherein the panels of selected facing material such as granite or marble have a thickness of less than one inch; and the thickness of the slurry sprayed on the back surface of the panels is substantially equal to or less than the thickness of the panels.

5. The method of claim 1, wherein the step of forming a plurality of support ribs from said slurry on the back surface of said building panel prior to curing said slurry.

6. A method of forming a building panel from a plurality of relatively thin, pre-sized panels of a selected facing material such as granite or marble comprising the steps of:

(a) placing the panels of the selected facing material face down into a supporting form;
(b) placing sealing means between adjacent edges of said panels and said form;
(c) securing anchors to the back surface of each panel of said facing material;
(d) forming a slurry of concrete and chopped glass fiber strands;
(e) spraying the slurry on the back surface of said panels of facing material to cover said panels and said anchors;
(f) forming a plurality of support ribs about said anchors from said slurry on the back surface of said building panel by:
  placing a form on the back side of said panel to be sprayed, said form extending above the back surface so said panel and above said anchors;
  spraying said slurry on the back surface of said panel and on one side of said form and about said anchors; and,
  partially curing said slurry and removing said form; and
(g) curing said slurry and removing the completed building panel from said supporting form.

* * * * *

REEXAMINATION CERTIFICATE (539th)

United States Patent [19]

[11] B1 4,404,158

Robinson

[45] Certificate Issued Jul. 22, 1986

[54] METHOD OF MAKING A BUILDING PANEL

[75] Inventor: Ralph C. Robinson, Redmond, Wash.

[73] Assignee: Olympian Stone Company, Redmond, Wash.

Reexamination Request:

No. 90/000,488, Jan. 19, 1984

Reexamination Certificate for:

| | |
|---|---|
| Patent No.: | **4,404,158** |
| Issued: | **Sep. 13, 1983** |
| Appl. No.: | **97,197** |
| Filed: | **Nov. 26, 1979** |

[51] Int. Cl.[4] .......................... B28B 21/44; B28B 21/70; B29C 39/10; B29C 41/22

[52] U.S. Cl. .......................... 264/263; 29/460; 264/264; 264/279; 264/309; 264/333

[58] Field of Search .......................... 264/309

[56] References Cited

U.S. PATENT DOCUMENTS

| | | | |
|---|---|---|---|
| 868,411 | 10/1907 | Cilek | 52/602 |
| 948,752 | 2/1910 | Wightman | 52/597 |
| 1,750,113 | 3/1930 | Martin | 264/256 |
| 2,114,048 | 4/1938 | Davis | 52/405 |
| 2,130,911 | 9/1938 | Teunon | 52/741 |
| 2,193,207 | 3/1940 | Rosen | 52/506 |
| 3,289,371 | 12/1966 | Pearson et al. | 264/309 |
| 3,694,533 | 9/1972 | Kelsey | 264/261 |
| 3,723,233 | 3/1973 | Bourke | 52/612 |
| 3,724,152 | 4/1973 | Castellaria | 52/378 |
| 3,885,008 | 5/1975 | Martin | 264/45.3 |
| 3,901,963 | 8/1975 | Werner | 264/228 |
| 3,963,846 | 6/1976 | Bourke et al. | 428/73 |
| 3,982,876 | 9/1976 | Eisenbach | 425/501 |
| 4,088,808 | 5/1978 | Cornwell et al. | 264/309 |
| 4,159,361 | 6/1979 | Schupack | 428/240 |
| 4,166,749 | 9/1979 | Sterrett | 106/93 |
| 4,173,486 | 11/1979 | Cheetham et al. | 106/99 |

FOREIGN PATENT DOCUMENTS

| | | | |
|---|---|---|---|
| 1418091 | 12/1975 | United Kingdom | 264/309 |

OTHER PUBLICATIONS

Anon., "PCI Manual for Structural Design . . . ", PCI Pub MNL-121-77, PCI Prestressed Concrete Inst., Chicago, Ill. (1977).

Jones et al., "Glass Fiber Reinforced Concrete Products . . . " Cem-Fil Corp., Nashville (1977).

Anon., "Marble-Faced Precast Panels", National Assoc. of Marble Producers.

Mylis, "Sprayed Reinforced Plastics", The Glass Industry, Oct. 1961, p. 581, Relied on.

"Marble-Faced Precast Panels", National Association of Marble Producers (1966), pp. 1, 3-6.

"PCI Manual for Structural Design of Architectural Precast Concrete", Prestressed Concrete Institute (1977), pp. 9-5, 9-6.

"Glass Fiber Reinforced Concrete Products-Properties and Applications", Article by John Jones & Thomas P. Lutz from Journal of Prestressed Concrete Institute, vol. 22, No. 3, May-Jun. 1977, pp. 4, 13-22.

*Primary Examiner*—Willard E. Hoag

[57] ABSTRACT

A method for making a panel adapted for mounting on a building, the panel being formed from a plurality of thin panels of a selected stone facing material, such as granite or marble, backed and interconnected by fiberglass-strengthened concrete underlaying the plurality of thin panels and covering and engaging anchor means mounted in the backs of the stone panels. The method of forming the building panel involves placing the granite or marble panels face down in a form, mounting anchor means in the backs thereof, and overlaying both the plurality of thin panels and the anchor means with a fiberglass-strengthened concrete mixture, and curing the mixture both within and without a support form.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–6 are cancelled.

* * * * *